United States Patent Office 3,687,738
Patented Aug. 29, 1972

3,687,738
COATED METAL AND METHOD
Irving Malkin, University Heights, Ohio, assignor to Diamond Shamrock Corporation, Cleveland, Ohio
No Drawing. Continuation-in-part of abandoned application Ser. No. 788,324, Dec. 31, 1968. This application Dec. 10, 1970, Ser. No. 96,967
Int. Cl. C23f 7/26
U.S. Cl. 148—6.2
20 Claims

ABSTRACT OF THE DISCLOSURE

A coating of $CrO_3$ and pulverulent metal in liquid medium proxides excellent corrosion protection for metal substrates as well as electroconductivity, e.g., for weldability and/or application of electrocoat primer. The pulverulent metal, liquids, and the $CrO_3$, as for example supplied by chromic acid, may be premixed and applied to the metal substrate. Substrates containing such compositions are baked and resulting coated surfaces also exhibit desirable adhesion for subsequently applied topcoats.

CROSS REFERENCE TO RELATED APPLICATION

This application is a continuation-in-part of U.S. application Ser. No. 788,324, filed Dec. 31, 1968, now abandoned.

BACKGROUND OF THE INVENTION

Chromic acid and, for example, t-butanol have heretofore been mixed together and applied to metal substrates followed by baking to attain a corrosion-resistant coating, such as disclosed in U.S. Patent 2,927,046. Related apparent modifications of this metal surface treatment include additions of water plus hydrocarbon solvents to the basic chromic acid/t-butanol compositions as disclosed for example in U.S. Patent 2,762,732. These compositions offer some corrosion protection, mainly for metal substrates that are not subsequently formed or shaped, and adhesion of subsequently applied topcoats may be augmented.

SUMMARY OF THE INVENTION

It has now been found that when surfaces of metal substrates have a coating of a hexavalent-chromium-containing liquid composition of the present invention, the coated substrates exhibit superior properties, even with respect to corrosion resistance after subsequent bending or forming of the substrate. Moreover, adhesion of subsequently applied topcoats to the coated substrate is very desirably upgraded.

Furthermore, it has been found that the enhanced corrosion resistance achieved by coatings of the present invention is coupled with retained electroconductivity, e.g., weldability for substrate metals. For example, coated substrates can be subjected to very extended electrical resistance welding and be free from deleterious film pick-up on the electrodes. Coated substrates may also receive subsequent deposition of electrocoat paint.

Broadly, the present invention is directed to a coating composition and to a metal substrate having at the surface thereof an adherent, water-insoluble and corrosion-resistant coating composition, which composition is substantially resin free and before curing comprises an intimate mixture in liquid medium of: (A) a hexavalent-chromium-providing material, supplied by at least about 80 weight percent chromic acid, and providing not in excess of about 200 grams per liter of chromium, expressed as $CrO_3$; (B) not substantially above about 1,000 grams per liter of liquid medium of pulverulent metal selected from the group consisting of zinc, manganese, aluminum, magnesium, mixtures thereof, and alloys of same, such composition having a weight ratio of chromium, expressed as $CrO_3$ to pulverulent metal of not substantially less than 0.08:1. Additionally the composition has: (C) below about 5 weight percent, based on the weight of pulverulent-metal-free composition, of agents selected from the group consisting of dispersing agents, suspending agents, defoaming agents, wetting agents, and mixtures thereof.

Additionally, the present invention relates to a coated metal substrate, and to the preparation of such a substrate, exhibiting the above-described adherent, corrosion-resistant coating. It is further directed to welded and electrocoated articles and to their production.

The metal substrates contemplated by the present invention are exemplified by the metal substrate to which a chromic acid/t-butanol, or chromic acid/water coating may or can be applied for enhancing corrosion resistance of such substrate metals. For example, such metal substrates may be aluminum and its alloys, zinc and its alloys, copper and cupriferous, e.g., brass and bronze. Additionally, exemplary metal substrates include cadmium, titanium, nickel, and its alloys, tin, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the "substrate."

For convenience, the hexavalent-chromium-containing liquid compositions are often referred to herein as "treating compositions" and the "residue" on a metal surface is such resulting surface condition obtained after application of such composition to, and heating resulting applied composition on, a metal substrate.

DESCRIPTION OF THE PREFERRED EMBODIMENTS

The corrosion-resistant, hexavalent-chromium-containing liquid composition contains chromic acid as the hexavalent-chromium-providing substance or its equivalent, for example, chromium trioxide or chromic acid anhydride. But a minor amount e.g., 20 percent or less, of such chromium can be supplied by a salt such as ammonium dichromate, or by sodium or potassium salts, or by substances such as calcium, barium, magnesium, zinc, cadmium, and strontium dichromate. Additionally, a minor amount such as 20 percent or less of the hexavalent-chromium-providing substance might be a mixed chromium compound, i.e., include trivalent chromium compounds. Although the liquid composition might contain as little as about 0.25 weight percent of hexavalent chromium, expressed as $CrO_3$, and may contain as much as about 500 grams per liter of composition of hexavalent chromium, expressed as $CrO_3$, such composition typically contains from about 1 up to about 10 weight percent of hexavalent chromium, expressed as $CrO_3$.

For supplying the liquid medium, although the water and t-butanol are miscible in all proportions, where t-butanol supplies the preponderant amount of the liquid medium, preferably only a very minor amount of the medium is water or water plus other liquid material to enhance corrosion resistance of final coated substrates. Thus, liquid mediums which are preponderantly t-butanol advantageously contain less than about 10 percent and preferably are virtually to completely water free. For economy, where water supplies the preponderant amount of the liquid medium, the balance of the medium advantageously contains less than about 25 percent of other liquids such as t-butanol, or hydrocarbons, and preferably, for enhanced economy, these liquids are present in an amount of less than about 15 percent by volume, or may be completely absent.

The liquid medium may also be preponderantly an inert organic liquid or blend of liquids, i.e., not readily oxidized in solution by chromic acid. Organic liquids have been discussed, for example, in U.S. Patents 2,762,732 and 3,437,531. Tertiary alcohols are present in such blends in typically at least twice the amount, on a molar basis, as the amount of chromic acid, to insure solution of such acid. Suitable inert liquids that have been, and may be, used include hydrocarbons such as benzene and pyridine and halogenated hydrocarbons such as trichlorethylene and carbon tetrachloride.

In some instances, for enhanced corrosion protection of the substrate, the metals for the pulverulent metal are the less noble metals, i.e., magnesium, aluminum, manganese, and zinc, as well as their alloys, e.g., zinciferous and aluminiferous metals, and additionally include mixtures of any such metals. Preferably, for efficiency and economy, such metal is zinc, or aluminum, or their mixtures.

The pulverulent metal can be flake, or powder, or both but should have particle size such that all particles pass 100 mesh and a major amount pass 325 mesh ("mesh" as used herein is U.S. Standard Sieve Series). Advantageously, for preparing a coated substrate having augmented uniformity in the distribution of the pulverulent metal, as well as enhanced bonding of metal to the substrate, the pulverulent metal employed is one wherein essentially all particles, e.g., 80 weight percent or more, pass 325 mesh. Within the range discussed herein, the desired amount of pulverulent metal present on the substrate surface may be a function of the average particle size of such metal. Thus, for best paint adhesion, the more coarse powders, i.e., those having average particle size approaching 5 microns and more, are employed in greater amounts than pulverulent metals having average particle size approaching one micron.

When the pulverulent metal is present in the coating composition, the composition should be made up with an amount of such metal sufficient to supply not substantially above about 1,000 grams of metal per liter of coating composition liquid medium. The presence of greater than about 1,000 grams per liter of pulverulent metal is undesirable, for example, can add expense without a significant increase in corrosion protection for the coated substrate. Preferably, for economy and desirable coating characteristic, the composition contains between about 50–500 grams of metal per liter.

Also, for such pulverulent metal containing coating compositions, the chromium, expressed as $CrO_3$, should not exceed more than about 200 grams per liter of composition medium. Greater than about 200 grams per liter of chromium is uneconomical and can deleteriously detract from the characteristics of the coated metal surface, for example, the most desirable corrosion resistance for the coated metal substrate. Further, such composition should have a weight ratio of chromium, expressed as $CrO_3$, to pulverulent metal of at least about 0.08:1. A ratio of less than about 0.08:1 may not provide sufficient chromium in the coating to achieve augmented bonding of the pulverulent metal to the metal substrate. A ratio of as great as about 2:1 may be achieved, but should be at metal concentrations of less than about 100 grams per liter. As the metal content approaches about 1,000 grams per liter and thus the chromium content can approach about 200 grams per liter the upper weight ratio of chromium, expressed as $CrO_3$, to pulverulent metal approaches 0.2:1. It has been found that the very concentrated coating compositions containing between about 500–1,000 grams per liter of pulverulent metal have particular utility in the coating of small parts as opposed to application to large substrate areas such as metal coils. Typically, the compositions containing pulverulent metal have above about 30 grams per liter of liquid medium of chromium, expressed as $CrO_3$, and below about 100 grams per liter of chromium.

The coating ingredients may be combined into separate packages, e.g., one containing the hexavalent-chromium-providing substance in a liquid medium, and the other package being a dispersion in liquid medium of pulverulent metal, each package additionally containing some surface active agent. Such separate packages may be blended together before application to the metal substrate or may be separately or simultaneously applied.

The pulverulent metal can be applied dry to the metal substrate, for example by simply brushing or blasting the metal onto the substrate, or by electrostatic spraying. When applied separately, it can be applied dry or applied as a dispersion in volatile liquid, for example, water or readily volatile alcohol, or other volatile organic liquids such as benzene, with water being preferred for economy. For economy, such dispersions advantageously contain at least about 5 grams per liter of dispersed metal, to avoid subsequent uneconomical evaporation of large amounts of volatile liquid, and may contain above 90 weight percent of pulverulent metal in the case of a dense metal such as zinc, i.e., above 65 volume percent of such metal.

Such dispersions and liquid compositions, i.e., the hexavalent-chromium-containing liquid composition additionally containing, or free from, pulverulent metal, may be applied to the metal substrate by any conventional method for coating a substrate with a liquid, for example, dip coating, roller coating or reverse roller coating, curtain coating, airless spray, rotary brush coating, pressure spray or combinations of such techniques as, for example, spray and brush techniques. However, for usual spray application, the amount of pulverulent metal in a dispersion for a dense metal such as zinc, does not exceed about 500 grams per liter. Typically the hexavalent-chromium-containing liquid composition is applied to a metal surface by simply dipping the metal article into the composition.

Where the pulverulent metal is applied as a separate dispersion such dispersion may be applied even after the application of the liquid composition, so long as such composition has not been cured. The metal surface can be a preheated metal surface to assist in the curing of the composition, or such liquid composition or dispersion may be applied to the metal surface after an etch, e.g., a nitric acid etch, or may be applied from a heated bath, for example, one heated up to 200° F. The metal-containing coating composition or the separate dispersion can contain up to, for example, about 5 weight percent of a surface active agent, and these can include dispersing agents, suspending agents, defoaming agents, and wetting agents, referred to herein for convenience simply as surface active agents. They may be present in as little as 0.001 weight percent.

Such agent may typically be a hydroxyl-containing hydrocarbon ether which includes the alkyl ethers of alkylene glycols, such as butyl ether of propylene glycol, the oxyalkyl ethers of alkylene glycols, e.g., 1-butoxyethoxy-2-propanol, fatty alcohol polyoxyalkylethers, alkylphenol polyoxyalkylethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil.

The resulting coating weights on the metal substrate may vary to a considerable degree but, exclusive of the pulverulent metal, the residue will most typically always be present in an amount supplying above about 5 milligrams per square foot of chromium, expressed as chromium and not $CrO_3$. Furthermore, residues containing below about 15 milligrams per square foot of chromium, expressed as chromium and not $CrO_3$, should be topcoated to impart significant enhancement in corrosion resistance of the coated substrate. Also if the coated metal substrate is to be subsequently formed, the residue should contain not substantially above about 150 milligrams per square foot of chromium as the coating may be subjected to cracking or crazing during forming operation, although for typically finished products when subsequent forming is not contemplated, and extended corrosion resistance without topcoating may be desirable, such residue may contain up to about 500 milligrams per square foot of chromium.

A subsequent paint topcoating is also a consideration for the amount of pulverulent metal that should be present on the surface of the substrate in the coating residue. Such residues containing about 10–20 milligrams per square foot of pulverulent metal are virtually always topcoated. However, subsequently topcoated residues can contain substantially more pulverulent metal, e.g., 600–700 milligrams per square foot of such metal, and the substrate may contain up to about 5,000 milligrams per square foot of pulverulent metal, whereas an excess of that amount is usually uneconomical.

It can be appreciated that the present invention is directed to coatings wherein there is an excess of pulverulent metal to chromium, even at the lesser concentrations of the metal. Generally, the coating should have a weight ratio of chromium, expressed as chromium and not $CrO_3$, to pulverulent metal of less than about 0.5:1, and, such ratio is most usually for the less heavy coating weights, since as the coating weights approach, for example, 5,000 milligrams per square foot of pulverulent metal, the weight ratio of chromium to pulverulent metal will be less than about 0.2:1. It has also been found that for coil coating, the weight ratio of chromium, expressed as chromium and not $CrO_3$, to pulverulent metal will preferably be in the range of between about 0.5:1–0.04:1, for economy and efficiency, with the weight for the metal in the coating residue being typically below about 2,000 milligrams per square foot of coated substrate. For coating small parts, i.e., parts smaller than coils, which can be final products that will not be normally subjected to subsequent forming, and where coating weights may approach 5,000 milligrams per square foot of pulverulent metal, the weight ratio of chromium to pulverulent metal in the coating may be as low as about 0.02:1.

Other compounds may be present in the hexavalent-chromium-containing liquid composition, but, even in combination, are present in very minor amounts so as not to deleteriously affect the coating integrity, e.g., with respect to weldability and galvanic protection. Thus, such compositions should contain 0–40 grams per liter of resin, i.e., are substantially resin-free, and contain 0–40 grams per liter of pigment. Since the adherence for the particulate metal to the metal substrate is achieved by the chromium-providing-substance, such coating compositions are preferably resin-free, and such coatings that will be subsequently topcoated are preferably pigment-free.

These other compounds further include inorganic salts and acids as well as organic substances, often typically employed in the metal coating art for imparting some corrosion resistance or enhancement in corrosion resistance for metal surfaces. Such materials include acids of phosphorous such as phosphoric acid, zinc chloride, magnesium chloride, various chromates, e.g., strontium chromate, molybdates, glutamic acid, fluoridic acid, succinic acid, zinc nitrate, succinimide, and polyacrylic acid and these are preferably avoided, but if present are most usually employed in the liquid composition in a total maximum amount of about 15 grams per liter. Such augmentation of corrosion resistance may also be obtained by quenching the coated metal substrate, following heating of the substrate containing applied liquid composition, in a bath which contains a minor amount, e.g., 5 weight percent or less and, for economy, advantageously a few weight percent or less, of an acid of phosphorous such as phosphoric acid. With phosphoric acid in the quenching bath, highly desirable resistance to corrosion has been obtained for metal substrates quenched in such baths containing as little as 0.1 weight percent of the acid. For the metal substrates containing applied liquid composition and pulverulent metal, the preferred temperature for the subsequent heating, which is also often referred to as curing and which may be preceded by drying such as air drying, is within the range from about 375° F. but more typically from about 425° F. at a pressure of 760 mm. Hg up to above about 900° F. Such an elevated substrate temperature may be attained by preheating the metal prior to application of the liquid composition. However, such curing temperatures do not often exceed a temperature within the range of about 450°–550° F. At the elevated curing temperatures the heating can be carried out in as rapidly as about 0.2 second or less but is often conducted for several minutes at a reduced temperature.

Before starting the treatment of the present invention it is, in most cases advisable to remove foreign matter from the metal surface by thoroughly cleaning and degreasing. De-greasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phosphate-sodium hydroxide cleaning solution. In addition to cleaning, the substrate can undergo cleaning plus etching, for example, with a hydrofluoric acid etching agent. To accomplish the substrate etching and instead of only applying the hexavalent-chromium-containing liquid composition, in some cases a mixture may be applied which incorporates the etching agent in such composition.

After heating, the resulting coated substrate of the present invention can be further topcoated with any suitable paint, i.e., a paint, primer, including electrocoating primers, enamel, varnish, of lacquer. Since the coated metal surfaces of the present invention can exhibit a desirable upgrading in topcoat adhesion when compared, for example, to the uncoated substrate metal, paints are often applied over such coated substrates. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, apoxys, acrylics, vinyl, including polyvinyl butyral and oil-wax-type coatings such as linseed oil-paraffin wax paints. The paints may be applied as mill finishes.

The liquid composition residue which is further topcoated with a weldable primer may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300° F. or less for compositions in a t-butyl alcohol medium, or a more elevated temperature cure of 350°–400° F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U.S. Patents 3,304,250 and 3,455,805.

Also, substances of particular interest, for example in the automotive industry, are the anodically deposited film-forming materials which have gained considerable acceptance in this field and are exemplified by U.S. Patent 3,230,162. However, the broad scope to which the electrodeposition of film-forming materials relates, includes the deposition of such materials on anodic or cathodic substrates, and by means of various techniques for passage of current through a bath, including even intermittent pulsed current. After electrodeposition and removal of the coated substrate from the bath, curing of the film-forming materials is performed. The time and temperature of curing will be dependent upon the film-forming materials present, but is typically an air cure at room temperature or a forced cure at a temperature up to 500° F. and for times up to 60 minutes, at more reduced temperatures.

The following examples show ways in which the invention has been practiced but should not be construed as limiting the invention. In the example the following procedures have been employed.

PREPARATION OF TEST PANELS

Steel test panels (4" x 12", unless otherwise specified, and all being cold rolled, low carbon steel panels) are typically prepared for subsequent treatment by immersing in water which has incorporated therein 2–5 ounces of cleaning solution per gallon of water. The cleaning solution is typically 75% by weight of potassium hydroxide and 25 weight percent tripotassium phosphate. The bath is maintained at a temperature of about 150°–180° F. After the cleaning treatment the panels are rinsed with warm water and dried.

APPLICATION OF COATING TO TEST PANELS

Clean panels are coated by dipping into coating composition, removing the panels and draining excess composition therefrom and then immediately baking or air drying at room temperature until the coating is dry to the touch and then baking. Baking proceeds under infrared lamps at a substrate temperature of up to about 450° F. for a time up to one minute, unless otherwise specified.

PANEL BENDING

90° and 180° bend

Unless otherwise specified in the examples, the panel bending, where corrosion resistance of coated panels is tested at a bend, is a 90° bend. This bend is obtained by manually grasping a test panel at the opposing edges of longest dimension and then manually bending the panel over the edge of a flat surface, such as the edge of a table, with the panel being typically positioned at such edge to obtain the bend at opproximately the mid-section of the panel. The bending is continued until the panel, by visual inspection, is viewed to have a bend of approximately 90°, or is removed from the edge and the bending continued until the panel is viewed to have a bend of about 180°.

Bearing bend

Where bearing bending is specified in the examples, such bending is attained by placing a hollow metal cylinder in an upright position and then centering the panel on the uppermost hollow end of the cylinder. The cylinder has a 1¼-inch inside diameter and its upper annular surface on which the panel is placed is beveled inwardly. After the panel is thus centered, a one-inch diameter, chromed steel bearing is placed on the panel approximately over the center of the hollow core of the cylinder. A die is then gradually pressed downwardly onto the bearing up to a pressure of 2,000 p.s.i. Upon removal of the die and the bearing the panel exhibits a dimple conforming to the roundness of the bearing and having a depth of about ¼-inch.

Mandrel bending

When mandrel test bending is specified in the examples such bending has been carried out by the procedure of ASTM D-522. Briefly, the testing method consists in deforming the coated metal panel by fastening the panel tangentially to the surface of a conical steel mandrel and forcing the sheet to conform to the shape of the mandrel by means of a roller bearing, rotatable about the long axis of the cone and disposed at the angle of the conical surface, the angle of deformation or arc travel of the roller bearing being approximately 100°.

WEATHER RACK TESTING

Corrosion protection under weathering conditions is obtained by mounting test panels on an outdoor rack to expose the panels to weathering conditions prevailing in the north central region of the United States. The test panels are mounted for such exposure as is obtained during late fall.

CORROSION RESISTANCE TEST (ASTM B-117-64)

Corrosion resistance of coated panels is measured by means of the standard salt spray (fog) test for paints and varnishes, ASTM B–117-64. In this test, the panels are placed in a chamber kept at constant temperature where they are exposed to a fine spray (fog) of a 5% salt solution for specified periods of time, rinsed in water and dried. The extent of corrosion on the test panels are then compared one with the other by visual inspection. Where test panels are scribed, the scribing is performed before testing the panel by cutting an X configuration on the face of the panel, the scribe lines being made through the coatings to expose the underlying metal. The extent of corrosion along the scribe lines is also made by visual inspection and through comparison among test panels.

CONDENSING HUMIDITY TEST

In this test water is heated in the bottom of a cabinet to produce a condition of 100 percent humidity in the cabinet and a temperature for the ambient steam within the cabinet of 120° F. Panels are placed in the cabinet at about a 15° angle to the water surface; the bottom edge of the panel is about 8 inches above the water surface, and the top edge about 10 inches above the water surface. To terminate the test, panels are simply removed from the cabinet. Upon removal, panels are air dried and visually inspected for rust on the face of the panel, that is, not around the panel edges. Results are reported as that portion of the total panel face, in percent, which exhibits red rust and blister coating failure. Where panels have been scribed before testing, in the manner described hereinbefore in connection with the corrosion resistance test ("salt spray"), results are reported for that portion of the scribe lines showing corrosion as determined by visual inspection of these lines.

Example 1.—Test panels are prepared and coated as described hereinbefore and subsequently bent in the manner above described. Coating baths for the panel contain 40 grams per liter CrO₃ and 200 grams per liter of zinc dust having an average particle size of 2.9 microns, as well as 0.5 gram per liter of a surface active agent, typically a lignosulfonate, in a t-butanol medium. Where baths contain additional ingredients, these have been shown in the table below as weight percents of such ingredients.

In the table below, results are reported for the salt spray test both for the face of the panel and the bent portion of the panel face. Panels which have not been bent before testing are shown as "not tested" for the bend. Duration of exposure of the panels to the test is also reported in the table below.

TABLE 1

| Additional ingredient, weight percent | Panel | Hours in test | Percent corrosion in salt spray | |
|---|---|---|---|---|
| | | | Bend | Face |
| None | 1 | 64 | 0 | <1. |
| | 2 | 64 | 0 | 0. |
| | 3-4 | ea. 65 | Both 0 | Both 0. |
| | 5 | 531 | N.T. | 0. |
| | 6 | 792 | N.T. | 0. |
| | ¹7 | 161 | 0 | 0. |
| | ¹8 | 161 | <1 | 0. |
| 0.7% ZnCl₂ | 1 | 113 | 0 | <1. |
| | 2 | 113 | 0 | <1. |
| | ²3-7 | ea. 258 | All 0 | All 1. |
| 0.7% MgCl₂·6H₂O | 1-4 | ea. 235 | All 0 | All 1. |
| | 5 | 235 | 0 | <1. |
| 1.2% ZnNO₃ | 1-2 | ea. 160 | Both 0 | Both 0. |
| | 3 | 160 | 0 | 1. |
| 1% H₃PO₄ | 1-2 | ea. 112 | Both 0 | Both 1. |

¹ Panels dipped in 48-hour old bath.
² Bath for one panel also contained 0.5 weight percent H₃PO₄.
NOTE.—N.T.=Not tested.

The above results thus show the excellent corrosion protection attained by the chromic acid/zinc powder/t-butanol baked coating as well as for such coatings from baths containing minor amounts of phosphoric acid or an inorganic salt. Corrosion protection for such compositions is not only obtained on unworked faces of the panels but also on portions of the panels which have been subjected to 90° bending before exposure to salt spray testing. Additionally, such protection can be achieved for greatly extended exposure with one panel retained in the bath for nearly 800 continuous hours of salt spray testing showing no visual corrosion and hence excellent protection for the coating composition.

Example 2.—Panels are prepared and coated as described hereinabove with coating baths as described in Example 1. Where coating baths contain additional ingredients, such substances have been shown in the table below in weight percent of the bath unless otherwise specified. The polyacrylic acid additional ingredient is a water solution of polyacrylic acid, ammonium polyacrylate and sodium polyacrylate. The solution has a total solids content of 25 weight percent, a pH of 2–3, a specific gravity of 1.09, and a viscosity at 25° C. as measured at 25 r.p.m. on a Brookfield viscosimeter of 500–1500 centipoises.

Also, as shown in the table below, some panels are coated with the Example 1 chromic acid/zinc powder/t-butanol composition and after baking in the manner described hereinbefore are quenched in a dilute bath of phosphoric acid. In the table, results are reported for the condensing humidity test for the face of test panels, and, where tested, for corrosion along scribed lines of panels as such testing and scribing has been described hereinbefore. Duration of such testing for each panel is also reported in the table.

TABLE 2

| Additional ingredient, weight percent | Panel | Hours in test | Percent corrosion in condensing humidity | |
|---|---|---|---|---|
| | | | Scribe | Face |
| None | 1 | 27 | 0 | 0. |
| 2.5% polyacrylic acid | 1-2 | ea. 24 | Both 0 | Both 0. |
| 0.5% H₃PO₄ | 1 | 27 | 0 | 0. |
| | 1 | 64 | 0 | 0. |
| | 2 | 90 | 0 | 0. |
| 0.7% ZnCl₂ | 1-3 | ea. 23 | All 0 | All 0. |
| | 4-5 | ea. 72 | Both 0 | Both 1. |
| 0.7% MgCl₂·6H₂O | 1-3 | ea. 64 | N.S. | All 0. |
| | 4-5 | ea. 67 | Both 0 | Both 0. |
| 0.25 volume percent H₃PO₄ quench | 1 | 136 | N.S. | 0. |
| | 2-3 | ea. 160 | N.S. | Both 0. |
| | 4-5 | ea. 184 | N.S. | Do. |
| | 6 | 208 | N.S. | 0. |
| | 7 | 360 | N.S. | 0. |

NOTE.—N.S.=No scribe.

These results demonstrate the excellent condensing humidity corrosion resistance for panels containing even minor amounts of phosphoric acid or inorganic chloride salts, as well as for coated and cured panels quenched in phosphoric acid. Such excellent corrosion resistance is not only demonstrated on panel faces but also along scribe lines cut through to the substrate metal. Moreover, such resistance on faces of panels include no ostensible corrosion after 360 hours of continuous testing, thereby demonstrating the desirable extended corrosion protection afforded by a phosphoric acid quench.

Additional test panels prepared in the manner described above, that is, coated by dipping in a t-butanol medium containing 40 grams per liter CrO₃ and 200 grams per liter of the pulverulent zinc, are, after curing by the above described method, further coated with a zinc-rich primer having a weight per gallon of 22 pounds, a viscosity of 80 seconds as measured on a No. 4 Ford cup after first mixing with 8 volume percent of an aromatic solvent prepared synthetically from petroleum and having a flash point of 145°–150° F., which primer cures to a coating containing 50 percent zinc, by volume. The primer coated panels are then cured for 90 seconds in an oven heated at 580° F. The panels display a cured film thickness of 0.5 mil. These panels are then subjected to electrical resistance spot welding.

The welding is performed with copper electrodes at an electrode gap of ⅜ inch using a slow closure rate, an electrode pressure of 550 pounds, and using a weld time of 24 half cycles based on a 60 cycle frequency and a weld heat of 12,500 amp-secs. During such welding, the substrate pulls an acceptable "button" in the peel test. In this peel test, two coupons (panels) which have been welded together by at least one spot weld are peeled apart past the weld, thereby tearing the welded spot from one of the coupons. Hence, one coupon has a hole at the place of the spot weld and the other coupon has a "button" of metal, at the place of the spot weld. The electrodes for the welding are circular and have a diameter of 0.250 inch. The buttons pulled from the initial test coupons, measured across their narrowest apparent diameter with a micrometer caliper calibrated for measuring to the nearest 0.001 inch, must be virtually 0.250 inch across. Additionally, buttons measured in the same manner as the test approaches 2,000 spot welds must measure at least 0.220 inch across. In view of the pulling of acceptable buttons to the 2,000 spot welds such panels are considered to be highly suitable for the electrical resistance spot welding.

Example 3.—Panels are prepared and cured in the manner described hereinbefore with the composition of Example 1. Panels after curing are quenched in a weak phosphoric acid bath containing the acid in amounts shown in the table below. Also as shown in the table below, one panel is quenched in water in place of an acid quench. All acid quenched panels are then scribed in the manner above described and then bent as described hereinbefore. In the table results are reported for such panels subjected to the salt spray test.

TABLE 3

| Ingredient in quench, volume percent | Panel | Hours in test | Percent corrosion in salt spray | | |
|---|---|---|---|---|---|
| | | | Face | Scribe | 90° bend |
| None, water only | 1 | 1,616 | 0 | N.T. | N.T. |
| 0.1% H$_3$PO$_4$ | 1 | 170 | 2 | 0 | 0. |
| | 2 | 170 | 0 | 0 | 0. |
| 0.2% H$_3$PO$_4$ | 1-2 | ea. 170 | Both 0 | Both 0 | Both 0. |
| 0.25% H$_3$PO$_4$ | 1-7 | ea. 360 | All 0 | All 0 | All 0. |

NOTE.—N.T.=Not Tested.

From Table 3 it can be seen that quenched panels including the one panel from the water quenching only display excellent corrosion resistance in salt spray testing even for panels which have been scribed through to the substrate metal and additionally bent before subjecting to the test.

Example 4.—Test panels are prepared as described above and coated in the manner described above with coating composition containing 150 grams per liter powdered zinc having an average particle size of 2.9 microns, in a t-butanol medium. One bath also contains 30 grams per liter CrO$_3$ and the panels dipped therein are designated A and B. The other bath contains 40 grams per liter CrO$_3$ and the panels dipped therein are designated panels C and D. After baking in the above-mentioned manner, all panels are quenched in a bath of 0.2 volume percent phosphoric acid.

Panels A and C are each scribed and subjected for 25 hours to the condensing humidity test described hereinbefore. Panels B and D are bent in the above-mentioned manner and are subjected to the salt spray test for 25 hours.

Results of such testing for all panels show freedom from corrosion on panel faces, scribes and bends after both tests, thereby demonstrating the desirable protection achieved for substrates coated with compositions of the present invention.

Example 5.—Four high tensile steel rods for prestressed concrete which each measure 12 inches long by 0.25 inch in diameter are cleaned by rubbing with a dry cleaning pad. The pad is a porous, fibrous pad of synthetic fiber and is impregnated with abrasive. Two rods are dipped in a t-butanol bath containing 200 grams per liter of powdered zinc having an average particle size of 2.9 microns, 40 grams per liter CrO$_3$, and 0.5 volume percent of phosphoric acid.

Two additional cleaned rods are coated by dipping in a t-butanol bath containing 200 grams per liter of the above-mentioned zinc, 40 grams per liter CrO$_3$, and 1 weight percent of ZnCl$_2$. All four rods are cured in a muffle furnace for a time, and up to a temperature, as shown in the table below. The rods are then subjected either to condensing humidity or to salt spray testing as described hereinabove. Results of such testing are shown in the table below.

TABLE 4

| Rod | Cure time, secs. | Cure temp., °F. | Condensing humidity | | Salt spray | |
|---|---|---|---|---|---|---|
| | | | Test, hrs. | Percent, corrosion | Test, hrs. | Percent, corrosion |
| 1 | 105 | 490°–520° | 48 | <1 | | |
| 2 | 105 | 490°–520° | | | 90 | 0 |
| 3 | 45 | 800° | 65 | 0 | | |
| 4 | 45 | 800° | | | 65 | 0 |

The above results thus demonstrate the rods coated with formulations of the present invention exhibit excellent corrosion resistance from both the condensing humidity and salt spray test even for very high temperature cured coating compositions. Such compositions and elevated temperature curing thus are deemed to be highly suitable for protecting the rods against corrosion.

Example 6.—Test panels are prepared as described above and coated in the manner described above with coating composition containing 300 grams per liter powdered zinc having an average particle size of 2.9 microns, 40 grams per liter of CrO$_3$, and 0.4 weight percent succinimide, in a t-butanol medium. Another test panel is prepared as above described and coated in the aforementioned manner in the above bath containing 300 grams per liter powdered zinc; however, the bath additionally contains one weight percent of MgCl$_2$.

After curing both panels in the above-mentioned manner, each panel is scribed and subjected for 24 hours to the condensing humidity test. After such testing the panels are visually inspected and found to be free from corrosion on both panel surfaces and along scribe lines thus demonstrating the desirable corrosion resistance achieved for such compositions of the present invention.

Example 7.—Test panels are prepared as described above and coated initially by dipping in a water medium containing 40 grams per liter of CrO$_3$ and 0.2 gram per liter of polyoxyethylated nonylphenol. After panels are removed and excess coating medium drained from the panels they are sprayed with a composition containing 150 grams per liter of zinc powder having an average particle size of 2.9 microns to prepare panels having about 200 milligrams per square foot of panel surface of zinc dust. These panels are then baked in the manner described hereinbefore and after baking panels are bent 25° and 45°.

After bending, the panels are subjected to the salt spray test for a total of 47 hours. Following removal from the salt spray test the panels are inspected both at the bend and on the face of the panels for corrosion and are found to be completely free over the entire panel surface from corrosion both for panels bent 25° and 45°. These results thereby demonstrate the desirable corrosion protection achieved by compositions of chromic acid and water which compositions receive, after application to a metal surface, a deposition of pulverulent zinc.

Example 8.—Test panels are prepared as described above and coated in the manner described above. Three panels are coated with composition containing 35 grams per liter of CrO$_3$ and 200 grams per liter of powdered zinc having an average particle size of 2.9 microns. Three panels are coated with a composition containing 200 grams per liter of the same powdered zinc and 45 grams per liter of CrO$_3$. Three additional panels are coated in a composition containing 300 grams per liter of the powdered zinc and 45 grams per liter of CrO$_3$. All of the coating compositions are in a t-butanol medium.

After curing all nine panels in the above-mentioned manner, one panel from each coating bath is bent 90° and subjected to salt spray. Additionally, one panel from each bath is scribed and subjected to the above-described condensing humidity test. Further, one panel resulting from each bath is scribed and subjected to the weather rack test. In the table below results of such testing are shown along with durations of the test. Additionally, for panels from each bath, there is shown in the table below the coating weight in milligrams per square foot, as well as the weight of zinc dust and the weight of chromium in the coating, both also in milligrams per square foot.

The above results thus demonstrate the excellent corrosion protection achieved for coatings obtained from baths containing varying concentrations of powdered zinc and CrO$_3$ in each of the salt spray, condensing humidity, and weather rack tests.

TABLE 5

| Bath concentrations, gms. CrO₃ gms. Zn dust | Coating weight, mgms./ft.² | Cr Wt., mgms./ft.² | Zn dust wt., mgms./ | Salt spray | | | Condensing humidity | | | Weather rack | | |
|---|---|---|---|---|---|---|---|---|---|---|---|---|
| | | | | Hrs. | Face | Bend | Hrs. | Face | Scribe | Days | Face [1] | Scribe |
| 35/200 | 403 | 34 | 335 | 120 | 2 | 0 | 150 | 0 | 0 | 23 | 0/2 | 0 |
| 45/200 | 415 | 41 | 333 | 120 | 0 | 0 | 48 | <1 | 1 | 23 | 0/3 | 0 |
| 45/300 | 603 | 41 | 521 | 120 | 0 | 0 | 48 | 0 | <1 | 23 | 0/>1 | 0 |

[1] The notation 0/2, for example, represents front/back faces, respectively.

Example 9.—Two test panels are prepared as described above and coated in the manner described above with a coating composition containing 75 grams per liter of $CrO_3$ and 500 grams per liter of powdered zinc, having an average particle size of 2.9 microns, in a t-butanol medium. After the panels are coated and excess composition drained therefrom, the panels are subjected to baking under infrared lamps for 35 seconds at a substrate temperature up to about 460° F.

After curing, each panel is quenched in a bath of 0.2 volume percent phosphoric acid. Subsequently, each panel is scribed, bent 90°, and subjected for 936 hours to the above-described salt spray test. After such extended corrosion resistance testing each panel is visually inspected, and both panels are found to be free from corrosion on panel surfaces, along scribe lines, and at the bend, thus demonstrating the excellent corrosion resistance achieved for such compositions of the present invention.

Example 10.—Panels are prepared and coated as described hereinabove with a t-butanol coating composition containing 35 grams per liter $CrO_3$ and 200 grams per liter of pulverulent zinc having an average particle size of 2.9 microns. The panels are cured in the manner discussed hereinbefore and after curing are quenched in a bath of 0.2 volume percent phosphoric acid.

As shown in the table below some panels are then scribed and all panels are bent in a manner also as shown in the table below. Thereafter, each panel is subjected to the salt spray test and the results of such testing are shown hereinbelow in the table.

TABLE 6

| Number of panels | Hours, each | Percent corrosion, salt spray | | |
|---|---|---|---|---|
| | | Face | Bend | Scribe |
| 3 | 304 | All 0 | All 0 [1] | All 0 |
| 4 | 240 | All 0 | All 0 [2] | N.T. |
| 2 | 184 | Both 0 | Both 0 [3] | Both 0 |

[1] 90° bend.
[2] Bearing bend.
[3] Conical mandrel bend.

NOTE.—N.T.=Not tested.

The above results thus show the highly desirable corrosion protection achieved in salt spray testing not only on scribed panel surfaces but on panel surfaces under extended testing which surfaces have been subjected either to the 90° bend, the bearing bend, or the conical mandrel bend which have been described hereinbefore.

Example 11.—Four test panels, measuring 2" x 6", are prepared as described above and coated as discussed hereinabove in a t-butanol bath containing 35 grams per liter $CrO_3$, 50 grams per liter of pulverulent aluminum flake, and 200 grams per liter of powdered zinc having an average particle size of 2.9 microns. Three of the panels are cured in the manner described above; one of these (panel A) is quenched in a water bath and the remaining two (panels B and C) are quenched in a bath of 0.2 volume percent phosphoric acid. The fourth panel (D) is cured by dipping for 5 seconds in a bath of molten lead and after removal therefrom is quenched in a bath of 0.2 volume percent phosphoric acid. The first two panels, i.e., A and B, are scribed and subjected to the salt spray test, and the remaining two panels, C and D, are subjected to the condensing humidity test. Duration of the tests as well as the result of such testing are shown for these panels in the table below.

TABLE 7

| Panel | Hours | Salt spray | Hours | Condensing humidity |
|---|---|---|---|---|
| A | 163 | 0% face and scribe | | N.T. |
| B | 163 | 0% face and scribe | | N.T. |
| C | | N.T. | 22.5 | 0 |
| D | | N.T. | 22.5 | 0 |

NOTE.—N.T.=Not tested.

The above results thus show the desirable corrosion protection achieved for coated panels prepared from baths containing mixtures of aluminum and zinc powders.

Example 12.—In this example, test panels are prepared and tested with compositions which are not compositions of the present invention. Nine test panels are prepared as described above and four panels are coated by dipping in a t-butyl alcohol medium containing 35 grams per liter of $CrO_3$ (standard bath). Four panels are coated by dipping in a t-butyl alcohol bath containing 35 grams per liter $CrO_3$ plus 0.2 gram per liter of nonyl phenyl polyethylene glycol ether (modified bath). The remaining panel is coated by dipping in a t-butyl alcohol bath containing 40 grams per liter $CrO_3$ (heavy bath). After all panels are thus coated they are cured as described hereinbefore.

One of the panels from each of the standard bath and the modified bath, as well as the panel from the heavy bath, are scribed. Following this, panels are subjected to condensing humidity and salt spray testing as described hereinabove. Results of such testing are shown in the table below.

TABLE 8

| | Part A, condensing humidity | | |
|---|---|---|---|
| | | Percent corrosion in condensing humidity | |
| Panel | Test hours | Face | Scribe |
| Standard bath | 17 | 5 | N.S. |
| Do | 17 | >5 | 20 |
| Modified bath | 17 | 5 | N.S. |
| Do | 17 | >5 | 20 |
| Heavy bath | 6.5 | 1-2 | 50 |

| | Part B, salt spray | |
|---|---|---|
| | Test hours | Salt spray, percent corrosion |
| Standard bath | 16.5 | >70 |
| Do | 16.5 | >60 |
| Modified bath | 16.5 | >75 |
| Do | 16.5 | >50 |

NOTE.—N.S.=Not scribed.

These results thus demonstrate that panels coated with compositions which are not of the present invention, that is, which do not contain pulverulent metal, offer only transitory corrosion resistance in either the condensing humidity or salt spray test. This limited protection is particularly undesirable in the salt spray test and along scribe lines in the condensing humidity test. Hence, such compositions, even with the elevated temperature curing, are deemed to be unsuitable for protecting panels against corrosion.

Example 13.—Test panels, prepared as described above, are coated with coating compositions as more particularly shown in the table below. However, the compositions contain from 50 to 82 g./l. of $CrO_3$, from 260–

300 g./l. of zinc flake, and all are compositions in a t-butyl alcohol liquid. For the first composition reported in the table, the zinc flake has an average thickness of 0.5 micron and about a 10 micron average diameter; the other compositions contain a flake having an average thickness of about 0.2 micron and an average diameter of about 10–15 microns. All panels are coated by dipping into the coating composition, removing and draining excess composition from the panel, and air drying at room temperature until the coating loses its wet appearance. All dried panels are baked under infrared lamps at a substrate temperature up to 450° F. and for a time of up to one minute.

Immediately after baking some panels are water quenched, as shown in the table below, in deionized water at about room temperature, while other panels are quenched in a phosphoric acid bath containing 0.25 weight percent phosphoric acid as also shown in the table. Further, some panels are scribed, and additional panels are bent, as shown in the table.

In Table 9, results are reported for the panels subjected to the salt spray test which has been described hereinbefore.

TABLE 9

| $CrO_3$, g./l. | Zinc flake, g./l. | Quench | Salt spray, hrs. | Percent corrosion |
|---|---|---|---|---|
| 50 | 300 | None | 690 | 0% face. 2% bend, 180°. |
| 50 | 300 | $H_3PO_4$ | 690 | 0% face. 0% bend, 180°. 0% scribe. |
| 50 | 300 | $H_2O$ | 690 | 0% face. |
| 75 | 300 | $H_2O$ | 546 | 0% face. |
| 82 | 260 | $H_2O$ | 546 | 0% face. |

The above results demonstrate the excellent coating protection in salt spray which is afforded by a t-butyl alcohol based composition containing zinc flake. The corrosion protection is excellent not only on flat surfaces but on scribes and bends, where tested, and for quenched and unquenched panels.

Additional panels, all of which have a substantial amount of resin in the coating, and which are therefore included herein for only comparative purposes, along with panels of applicants' invention, are prepared as described above. They are coated with a composition containing 70 g./l. of $CrO_3$ and 300 g./l. of the zinc described hereinabove having the 0.5 micron thickness. Additionally the coating composition contains 5 percent by weight, that is, 58 grams per liter, of a powdered, polyvinyl chloride low fusion dispersion resin. This provides a particulate metal to resin ratio of 300 to 58 or about 5.2:1. The resin has a specific gravity of 1.37 and a bulk density of 15–19 pounds per cubic foot, as well as two drops of a high boiling sulfur-containing organotin stabilizer which is a colorless liquid having a decomposition temperature of about 200° C.

Panels are coated by dipping into this coating composition, removing and draining excess composition from the panel and air drying at room temperature until the coating is visibly dry. After this, panels are baked under infrared lamps at a substrate temperature as shown in Table 10 below for a time of about one minute. After cooling, panels are bent 180°.

In Table 10 results are reported for the salt spray test and the figures presented are for percent red rust on the face as well as on the bend after 91 hours of salt spray exposure.

TABLE 10

| Panel | Cure temp., °F. | Percent red rust Face | Bend |
|---|---|---|---|
| 1 | 300 | 5 | 5 |
| 2 | 350 | 8 | 10 |
| 3 | 400 | 6 | 8 |
| 4 | 450 | 3 | 12 |

As can be seen from these results, including even as little as 5 weight percent polyvinyl chloride resin in the coating composition detracts from achieving excellent corrosion resistance for the panels, since all panels begin to show significant red rust on both face and bend after only 91 hours of salt spray exposure.

Example 14.—Test panels are prepared as described above and are coated, one (Panel A) with a coating composition containing 50 g./l. $CrO_3$, 20 g./l. of aluminum flake having 100% of the particles through 325 mesh, a specific gravity of about 2.50 and an average leafing value for 1.0 gram of 75%, and 300 g./l. of zinc dust having an average particle size of 3 microns. The coating composition for this panel is tertiary butyl alcohol based.

Two additional panels (B and C) are coated with a composition containing 35 g./l. $CrO_3$, 50 g./l. of the above-described aluminum flake, and 200 g./l. of the above-described zinc dust. The coating compositions for these panels are water based.

All panels A, B, and C are coated by dipping into the respective coating compositions, removing and draining excess composition from the panel, and air drying at room temperature until the coating is visibly dry. After such application, panels are then baked under infrared lamps at a substrate temperature of up to 450° F. and for a time up to one minute. Panel B is then immediately water quenched and Panel C is immediately quenched in phosphoric acid, as described in Example 13. All panels are then scribed before testing.

In Table 11 below results are reported for Panel A, which is subjected to the condensing humidity test, and for Panels B and C, which are subjected to the salt spray test, as percentages of red rust.

TABLE 11

| Panel | Test hour | Type of test | Results of testing |
|---|---|---|---|
| A | 318 | Condensing humidity. | Less than 1% scribe, few pinpoints face. |
| B | 163 | Salt spray | 0% face, 0% scribe. |
| C | 163 | do | Do. |

These results demonstrate the desirable corrosion resistance which can be obtained for a metal substrate by applying thereto a coating composition containing a combination of pulverulent aluminum and zinc. Such corrosion resistance can be demonstrated not only on salt spray but also on condensing humidity testing and for an extended period on both the panel face and on panel scribe lines.

Example 15.—A test panel is prepared as described above and is coated with a coating composition containing 20 g./l. of $CrO_3$, and 150 g./l. of powdered zinc having an average particle size of about 5 microns. The panel is coated and cured as described hereinabove. Analysis shows that the undercoated panel contains 30 milligrams per square foot (mgms./ft.$^2$) of chromium, and 250 mgms./ft.$^2$ of zinc. This panel is subjected to the most severe, extended electrical resistance spot welding, such as has found acceptance in the automotive industry. Such stringent, extended electrical resistance spot welding requires that the panels proceed through 2,000 spots with a minimum of misfiring, i.e., with a minimum of welding failures although the panel goes through the weld cycle. To pass the specification of the automobile industry, such a panel must additionally provide a button after 2,000 spots measuring at least 0.220 inch across. The results of such extended spot weld testing are as follows:

TABLE 12

| | |
|---|---|
| Coating chromium,[1] mgms./ft.$^2$ | 30 |
| Coating zinc, mgms./ft.$^2$ | 250 |
| Elec. resis. spot welds: | |
| No. | 2,000 |
| Misfires [2] | None |
| Button dia. at 2,000 | 0.260″ |

[1] Expressed as chromium and not $CrO_3$
[2] No weld achieved although panel goes through weld cycle.

As can be seen from the table, the panel readily passes even this most severe electrical resistance spot welding test, pulling a good button, as well as being essentially free from misfires.

Example 16.—A test panel (B) is prepared as described above and is coated with the composition of Example 15 and in the manner of Example 15. The panel is dried and then baked as described hereinabove. The panel (B) as well as a clean steel panel (A) are coated with a black-pigment electrocoat primer containing at first 40 percent of non-volatiles which before use is reduced with deionized water in a proportion of 1 part by volume paint to 3 parts by volume water. Panels are immersed in the electrocoat paint bath as anodes and paint is applied typically for 0.5 minute at 100 volts. Following removal of the panels from the electrocoating bath, the panels are baked for 20 minutes at a temperature of 400° F. After baking, the panels are scribed, the scribing is performed by cutting an X configuration on the face of the panel, the scribe lines being made through the coating to expose the underlying metal. The extent of corrosion along the scribe lines is made by visual inspection and through comparison among test panels.

Both panels are subjected to the corrosion resistance test as described hereinbefore. In the table below the results of such corrosion resistance testing are shown. The results are presented as inches of failure of paint adhesion, to the nearest 1/32 of an inch, away from the scribe lines.

TABLE 13

| Panels | Undercoat | Salt spray, 120 hours | |
| --- | --- | --- | --- |
| | | Scribe | Face |
| A | No | CLA | CLA. |
| B | Yes | 12/32 | No. 4, L¹. |

¹ Numbers refer to blisters in accordance with ASTM D-714-56, and L=light.

NOTE.—CLA=Complete loss of paint adhesion.

As can be seen from the above results, the electrocoat primer alone over the bare steel does not exhibit any desirable paint adhesion. Only the electrocoat over the undercoating achieve augmented corrosion resistance. Further, where undercoating alone from chromic-acid-containing baths, that are free from pulverulent metal, are electrocoated, corrosion resistance can be very unsatisfactory, especially after 120 hours of salt spray testing.

I claim:

1. A coating composition for application to, and curing on, a metal substrate, thereby preparing an adherent, water insoluble, and corrosion resistant coating on said substrate, which composition is substantially resin free and before curing comprises an intimate mixture in liquid medium of:
   (A) a hexavalent-chromium-providing substance, supplied by at least about 80 weight percent chromic acid and providing not in excess of about 200 grams per liter of chromium, expressed as CrO₃;
   (B) from about 50 to not substantially above about 1,000 grams per liter of liquid medium of pulverulent metal selected from the group consisting of zinc, manganese, aluminum, magnesium, mixtures thereof and alloys of same, said composition having a weight ratio of chromium, expressed as CrO₃, to pulverulent metal of not substantially less than 0.08:1; and
   (C) below about 5 weight percent, based on the weight of pulverulent-metal-free composition, of agents selected from the group consisting of dispersing agents, suspending agents, defoaming agents, wetting agents, and mixtures thereof.

2. The coating composition of claim 1 wherein said liquid medium contains 0–40 grams per liter of pigment, phosphate compounds in amounts supplying not above about 15 grams per liter, less than 40 grams per liter of resin, and has a weight ratio of pulverulent metal to resin of greater than 5.2:1.

3. The coating composition of claim 1 containing from about 30 to 100 grams per liter of liquid medium of chromium, expressed as CrO₃ and not substantially above about 20 grams per liter of metallic ions.

4. The composition of claim 1 wherein said hexavalent-chromium-providing substance is supplied substantially by chromic acid, the major portion of the liquid of said medium is selected from the group consising of water and t-butanol, and said pulverulent metal is selected from the group consisting of zinc, aluminum, mixtures thereof, and alloys of same.

5. A coated metal substrate having on the surface thereof an adherent, corrosion resistant and substantially resin-free and water-insoluble coating, which coating comprises not substantially above about 5,000 milligrams per square foot of coated substrate of pulverulent metal selected from the group consisting of zinc, aluminum, manganese, magnesium, mixtures thereof, and alloys of same in intimate mixture with the residue from a substantially resin-free, hexavalent - chromium - containing liquid composition containing a hexavalent-chromium-providing material supplied by at least about 80 weight percent chromic acid, in liquid medium, said liquid composition providing said residue with from about 5 to not above about 500 milligrams per square foot of coated substrate of chromium, wherein said coating contains a weight ratio of chromium to pulverulent metal not substantially above about 0.5:1, and said residue is obtained by applying to said metal surface said hexavalent-chromium-containing liquid composition and heating said substrate at a temperature, and for a period of time, sufficient to vaporize volatile substituents from said coating composition and deposit on said surface said residue.

6. The coated metal substrate of claim 5 containing from about 10 to about 2,000 milligrams per square foot of pulverulent metal and about 5 to about 150 milligrams per square foot of chromium, said coated substrate being further topcoated.

7. The coated metal substrate of claim 5 wherein said residue is the residue remaining after heating applied coating at a temperature not substantially above about 900° F. and for a time of at least about 0.2 second.

8. The method of preparing a coated metal substrate having on the surface thereof an adherent, corrosion resistant and substantially resin-free and water-insoluble coating, which method comprises:
   (1) applying to said surface a substantially resin-free hexavalent-chromium-containing liquid composition containing a hexavalent-chromium-providing material, supplied by at least about 80 weight percent chromic acid, and liquid medium, and in an amount sufficient to provide from about 5 to not above about 500 milligrams per square foot of coated substrate of chromium;
   (2) applying to said surface pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not substantially above about 0.5:1; and
   (3) heating said substrate at a temperature, and for a period of time, sufficient to vaporize volatile substituents from said liquid composition and deposit on said surface said coating.

9. The method of claim 8 wherein said pulverulent metal is applied to said surface after the application of said liquid composition and said substrate is heated at a substrate temperature not substantially above about 900° F. and for a time of at least about 0.2 second.

10. The method of claim 8 wherein said pulverulent metal is applied to said surface as part of said liquid composition and in an amount sufficient to provide from about 10 to about 2,000 milligrams per square foot of said pulverulent metal, said coating composition further providing from about 5 to about 150 milligrams per square foot of chromium, and said coated metal substrate is subsequently topcoated.

11. The method of preparing a weldable substrate for electrical resistance welding and having desirable corrosion resistance, which method comprises:
(1) establishing on the surface of said substrate, on at least a portion thereof where welding will take place, not substantially above about 5,000 milligrams per square foot of coated substrate of pulverulent metal selected from the group consisting of zinc, aluminum, manganese, magnesium, mixtures thereof, and alloys of same, in intimate mixture with a substantially resin-free, hexavalent-chromium-containing liquid composition containing a hexavalent-chromium-providing material, supplied by at least about 80 weight percent chromic acid, and liquid medium, with residue from said liquid composition being in an amount sufficient to provide said coating with from about 5 to not above about 500 milligrams per square foot of coated substrate of chromium, and to further provide said coating with a weight ratio of chromium to pulverulent metal not substantially above about 0.5:1; and
(2) heating said substrate at a temperature, and for a period of time, sufficient to vaporize volatile substituents from said liquid composition thereby depositing on said surface said composition residue and preparing said substrate for welding with a coating providing corrosion resistance and weldable electroconductivity.

12. The method of claim 11 wherein said substrate after establishing said liquid composition thereon is heated at a temperature not substantially in excess of about 900° F. and for a time of at least about 0.2 second.

13. A weldable metal substrate prepared for electrical resistance welding according to the method of claim 11.

14. The method of electrical resistance welding metallic articles which comprises:
(1) establishing on at least one article, and on at least a portion of the metallic substrate surface where welding will take place, not substantially above about 5,000 milligrams per square foot of coated substrate of pulverulent metal selected from the group consisting of zinc, aluminum, manganese, magnesium, mixtures thereof, and alloys of same, in intimate mixing with a substantially resin-free, hexavalent-chromium-containing liquid composition containing a hexavalent-chromium-providing material, supplied by at least about 80 weight percent chromic acid, and liquid medium, with residue from said liquid composition being in an amount sufficient to provide said coating with from about 5 to not above about 500 milligrams per square foot of coated substrate of chromium, and to further provide said coating with a weight ratio of chromium to pulverulent metal not substantially above about 0.5:1; and
(2) heating said substrate at a temperature and for a period of time sufficient to vaporize volatile substituents from said coating composition and deposit on said surface a substantially water insoluble and resin-free coating of liquid composition residue and pulverulent metal, said coating providing corrosion resistance and weldable electroconductivity thereon;
(3) contacting at least a portion of said one article with another article of metal to be welded;
(4) passing an electrical resistance welding current through said articles of metal and said coating thereon at the zone selected for welding; and
(5) fusing said articles together in said zone of said welding.

15. A welded article prepared according to the method of claim 14.

16. The method of preparing a substrate for receiving a deposition of electrocoat paint, which method comprises:
(1) applying to said surface a substantially resin-free hexavalent-chromium-containing liquid composition containing a hexavalent-chromium-providing material, supplied by at least about 80 weight percent chromic acid, and liquid medium, and in an amount sufficient to provide from about 5 to not above about 500 milligrams per square foot of coated substrate of chromium;
(2) applying to said surface pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not substantially above about 0.5:1; and
(3) heating said substrate at a temperature and for a period of time sufficient to vaporize volatile substituents from said liquid composition and deposit on said surface a substantially water insoluble and resin-free coating of liquid composition residue and pulverulent metal, said coating providing electroconductivity for deposition of electrocoat paint thereon.

17. The method of applying electrocoat paint to a substrate treated to receive the deposition of such paint, which method comprises:
(1) applying to said surface a substantially resin-free hexavalent-chromium-containing liquid composition containing a hexavalent-chromium-providing material, supplied by at least about 80 weight percent chromic acid, and liquid medium, and in an amount sufficient to provide from about 5 to not above about 500 milligrams per square foot of coated substrate of chromium;
(2) applying to said surface pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not substantially above about 0.5:1; and
(3) heating said substrate at a temperature and for a period of time sufficient to vaporize volatile substituents from said liquid composition and deposit on said surface a substantially water insoluble and resin-free coating of liquid composition residue and pulverulent metal, said coating providing electroconductivity on said substrate and thereby establishing a treated surface.
(4) immersing into a bath of electrocoat paint containing an electrode the resulting treated surface and preparing same as an electrode; and
(5) electrolyzing said bath of electrocoat paint.

18. An electrocoated article prepared by the process of claim 17.

19. The method of preparing a corrosion resistant, welded metal assembly having an electrocoat painted surface which method comprises:
(1) establishing, before welding, on the substrate surface of at least one article for welding, and on at least a portion of the article surface where welding will take place, not substantially above 5,000 milligrams per square foot of coated substrate of pulverulent metal selected from the group consisting of zinc, aluminum, manganese, magnesium, mixtures thereof, and alloys of same, in intimate mixture with a substantially resin-free, hexavalent-chromium-containing liquid composition containing a hexavalent-chromium-providing material, supplied by at least about 80 weight percent chromic acid, and liquid medium, with residue from said liquid composition being in an amount sufficient to provide said coating with from about 5 to not above about 500 milligrams per square foot of coated substrate of chromium, and to further provide said coating with a weight ratio of chromium to pulverulent metal not substantially above about 0.5:1; and (2) heating said substrate at a temperature, and for a period of time, sufficient to vaporize volatile substituents from said liquid composition thereby depositing on said surface said composition residue and preparing said substrate for welding with a coating providing corrosion resistance and weldable electroconductivity.

(3) contacting at least a portion of the article having the prepared substrate with another article of metal to be welded;

(4) passing an electrical resistance welding current through said articles of metal and said coating thereon at the zone selected for welding, and fusing said articles together at said zone of welding, thereby forming said welded metal assembly;

(5) immersing into a bath of electrocoat paint containing an electrode the resulting assembly and preparing same as an electrode; and (6) electrolyzing said bath of electrocoat paint.

20. A welded and electrocoated assembly prepared by the process of claim 19.

References Cited

UNITED STATES PATENTS

| | | | |
|---|---|---|---|
| 3,318,716 | 5/1967 | Schuster | 148—6.2 X |
| 3,502,511 | 3/1970 | Forsberg | 148—6.15 R |
| 3,454,483 | 7/1969 | Freeman | 148—6.15 R X |
| 3,325,432 | 6/1967 | Kellert et al. | 148—6.2 X |
| 2,662,838 | 12/1953 | Oven | 148—6.16 |
| 3,462,319 | 8/1969 | Campbell | 148—6.16 |
| 3,248,251 | 4/1966 | Allen | 148—6.16 |
| 2,911,332 | 11/1959 | Schuster | 148—6.2 |
| 2,768,104 | 10/1956 | Schuster | 148—6.16 |

RALPH KENDALL, Primary Examiner

U.S. Cl. X.R.

29—191, 488; 148—31.5; 204—181